United States Patent [19]

Wenzel et al.

[11] 4,306,998

[45] Dec. 22, 1981

[54] PROCESS FOR THE PREPARATION OF STABLE AQUEOUS DISPERSIONS OF OLIGOURETHANES OR POLYURETHANES AND THEIR USE AS COATING COMPOUNDS FOR FLEXIBLE OR RIGID SUBSTRATES

[75] Inventors: Wolfgang Wenzel, Bergisch-Gladbach; Günter Mertens; Dieter Dieterich, both of Leverkusen, all of Fed. Rep. of Germany

[73] Assignee: Bayer Aktiengesellschaft, Leverkusen, Fed. Rep. of Germany

[21] Appl. No.: 166,938

[22] Filed: Jul. 8, 1980

[30] Foreign Application Priority Data

Jul. 26, 1979 [DE] Fed. Rep. of Germany ....... 2930410

[51] Int. Cl.$^3$ ............................................. C08L 1/26
[52] U.S. Cl. ......................................... 260/13; 260/6; 260/9; 260/18 TN; 260/28 R; 260/29.2 M; 260/29.2 TN; 260/29.2 EP; 260/29.2 E; 260/29.4 R; 428/473; 528/48; 528/85
[58] Field of Search ............... 260/29.2 TN, 13, 28 P; 528/48, 67, 68

[56] References Cited

U.S. PATENT DOCUMENTS

| | | | |
|---|---|---|---|
| 3,479,310 | 11/1969 | Dieterich et al. | 260/29.2 |
| 3,756,992 | 9/1973 | Dieterich | 260/77.5 Q |
| 3,816,168 | 6/1974 | Lewis et al. | 117/142 |
| 3,823,102 | 7/1974 | Elmer et al. | 260/16 |
| 3,834,936 | 9/1974 | Schroer et al. | 117/142 |
| 3,923,713 | 12/1975 | Hermann | 260/29.2 TN |
| 3,988,278 | 10/1976 | Bartizal | 260/29.2 TN |
| 4,048,001 | 9/1977 | Remley | 156/331 |
| 4,066,818 | 1/1978 | Junge et al. | 428/341 |
| 4,094,842 | 6/1978 | Wenzel et al. | 260/29.2 TN |
| 4,108,814 | 8/1978 | Reiff et al. | 260/29.2 TN |

FOREIGN PATENT DOCUMENTS

| | | |
|---|---|---|
| 1495745 | 3/1970 | Fed. Rep. of Germany . |
| 1669346 | 6/1971 | Fed. Rep. of Germany . |
| 1694175 | 8/1971 | Fed. Rep. of Germany . |
| 2555534 | 6/1977 | Fed. Rep. of Germany . |
| 1578307 | 8/1969 | France . |
| 1465415 | 2/1977 | United Kingdom . |

OTHER PUBLICATIONS

D. Dieterich et al., Angew Chem. vol. 9, (1970) pp. 40–50 "Polyurethane Ionomers, a New Class of Block Polymers".

*Primary Examiner*—Theodore E. Pertilla
*Attorney, Agent, or Firm*—Gene Harsh; Lawrence S. Pope; Thomas W. Roy

[57] ABSTRACT

A process is provided for preparing storage stable, aqueous dispersions of oligourethanes or polyurethanes in admixture with auxiliary agents and additives which are not soluble nor dispersible in water. The oligourethanes or polyurethanes are rendered dispersible in water by incorporating ionic and/or non-ionic hydrophilic groups. In order that the final product remains storage stable, the auxiliary agents or additives are added to the oligourethanes or polyurethanes before they are dispersed in water.

9 Claims, No Drawings

PROCESS FOR THE PREPARATION OF STABLE AQUEOUS DISPERSIONS OF OLIGOURETHANES OR POLYURETHANES AND THEIR USE AS COATING COMPOUNDS FOR FLEXIBLE OR RIGID SUBSTRATES

BACKGROUND OF THE INVENTION

1. Field of the Invention

This invention relates to a novel process for the preparation of aqueous dispersions or solutions of oligourethanes or polyurethanes containing auxiliary agents and additives which are neither dispersible nor soluble in water, and the use of these solutions or dispersions as coating compounds for flexible or rigid substrates.

2. Description of the Prior Art

The preparation of stable, aqueous polyurethane-polyurea dispersions in known in the art and is described, for example, in German Offenlegungsschriften Nos. 1,495,745; 1,770,068; 2,555,534; 2,446,440 and 2,543,091; U.S. Pat. Nos. 3,479,310; 3,756,992 and 4,108,814 and D. Dieterich et al, Angew. Chem. 82, 53 (1970).

These processes of preparation may be subdivided into those which depend on the use of solvents and the so-called solvent-free processes.

In the processes which require the use of solvents, high molecular weight polyurethanes are synthesized by polyaddition in an organic solution, i.e., in a homogeneous phase, before they are dispersed in water. This method results in exceptionally high quality polyurethane films which satisfy even the stringent requirements for textile coating compounds.

Among the solvent-free processes, two should be particularly mentioned, namely, the so-called solvent-free dispersion process, which has been outlined in principle, e.g., in German Offenlegungsschrift No. 1,770,068 and U.S. Pat. No. 3,756,992 and the process described in German Offenlegungsschriften No. 2,446,440 and U.S. Pat. No. 4,108,814 in which a prepolymer containing sulphonate and isocyanate groups is subjected to a reaction with a diamine accompanied by chain lengthening during or after the dispersion process.

These aqueous dispersions have all of the advantages of polyurethanes, such as good processing characteristics and excellent physical fastness properties.

On the other hand, they often have disadvantages, such as poor, rubber-like handle when applied as top coats and insufficient levelling power of the dispersions.

There have therefore been many proposals to obviate these disadvantages by the addition of certain auxiliary agents and additives. Thus, for example, in German Offenlegungsschrift No. 2,138,016 and in U.S. Pat. Nos. 3,816,168 and 3,823,102, it is recommended to improve the handle of dissolved polyurethanes by the addition of nitrocellulose or other auxiliaries. These methods are substantially limited to the use of organic solutions of the auxiliary agents to modify dissolved polyurethanes. In German Offenlegungsschrift No. 2,542,767 it is recommended that nitrocellulose and/or cellulose acetobutyrate enriched with plasticizers and emulsifiers and dissolved in organic solvents should be added to an organic solution of a polyurethane and the resulting combination should then be converted into an aqueous dispersion. In this case the solvent remains in the aqueous dispersion, with the result that the well known disadvantages of systems containing solvents (fire characteristics, environmental problems) are not overcome.

German Offenlegungsschrift No. 1,770,068 describes the modification of polyurethane dispersions with various polymers, pigments and the like, in particular for modifying a polyurethane which has already been dispersed. In this method of modification, the dispersion contains two products side by side which often separate if the substance added is not dispersible in water. Furthermore, it is sometimes necessary to add plasticizers and emulsifiers, e.g., when nitrocellulose is used.

In the case of aqueous dispersions which have been prepared using acetone, for example, by the solvent process according to German Offenlegungsschrift No. 1,495,745 or No. 1,694,175, substances which are insoluble in water but soluble in acetone, for example, may be incorporated. The acetonic solution is converted into a homogeneous dispersion with water, and the solvent is subsequently evaporated off.

The problem, however, remained that additives which were insoluble in water and incapable of being dispersed in water without the addition of emulsifiers were required to be incorporated in aqueous polyurethane dispersions without the use of readily inflammable solvents so that such dispersions suitable for storage could be obtained. One particular problem was that auxiliary agents for the dressing of leather, in particular, those of the type exemplified under 1 and 2, below, which are neither soluble nor dispersible in water and often insoluble or only difficulty soluble in organic media were required to be incorporated in solvent-free, aqueous polyurethane dispersions suitable for the dressing of leather, in particular as leather finishes, to produce storage stable dispersions containing the aforesaid auxiliary agents.

These problems underlying the present invention could surprisingly be solved by the process according to the invention which is described below.

BRIEF DESCRIPTION OF THE INVENTION

This invention relates to a process for the preparation of storage stable, aqueous dispersions of oligourethanes or polyurethanes containing chemically fixed ionic and-/or non-ionic hydrophilic groups which ensure their dispersibility in water and auxiliary agents and additives which are not soluble or dispersible in water, by the known method of converting oligourethanes having a molecular weight below 20,000 which contain chemically fixed potential ionic, ionic, or non-ionic hydrophilic groups and optionally also groups promoting a chain lengthening or cross-linking reaction into an aqueous dispersion by mixing them with water, optionally with simultaneous or subsequent chain lengthening of the oligourethanes by a reaction with a chain lengthening agent and optionally with at least partial conversion of any potential ionic groups present into ionic groups, characterized in that before the oligourethanes are mixed with water, they are mixed intimately in the liquid phase with the auxiliary agent and additives which are insoluble and non-dispersible in water, or alternatively the auxiliary agents and additives are previously incorporated in one of the starting compounds used for the preparation of the oligourethanes.

The present invention also relates to the use of the dispersions obtained as described above as coating compounds for flexible or rigid substrates.

DETAILED DESCRIPTION OF THE INVENTION

The preparation of oligourethanes to be used in the process according to the invention belongs to the state of the art and has been described, for example, in the publications referred to below.

The oligourethanes which are suitable for the process according to the invention are either liquid at room temperature or can be melted by heating to not more than 150° C. and have a calculated molecular weight (see U.S. Pat. No. 3,756,992, col. 23, lines 4–15) of less than about 20,000, preferably from about 1000 to 10,000 and most preferably from about 1,200 to 5,000. Furthermore, the oligourethanes contain a sufficient quantity of chemically fixed hydrophilic groups to ensure that they will be dispersible in water, i.e., they are (potentially) anionic and/or (potentially) cationic and/or non-ionic hydrophilic compounds which generally contain about 0 to 200, preferably about 5 to 50, most preferably about 5 to 20 milliequivalents of (potential) ionic groups in 100 g of solid substance, and/or about 0 to 20% by weight, preferably about 1 to 10% by weight of ethylene oxide segments, preferably fixed within polyether chains. In these compounds it must always be ensured that sufficient hydrophilic groups are present to render them dispersible. The term "potential" ionic groups means that the urethane contains either free acid groups (potentially anionic) or e.g., tertiary nitrogen groups (potentially cationic) which can be either completely or partially converted into ionic groups by a suitable reagent during the dispersion process. This conversion of a potentially ionic group into an ionic groups is generally effected by a known neutralization reaction.

The preferred ionic groups include the sulphonate group $SO^-_3$, the carboxylate group $COO^-$ and the ammonium group $=N=^+$.

The oligourethanes to be used in the process according to the invention are preferably compounds which have a substantially linear molecular structure and which contain reactive groups capable of chain lengthening or cross-linking reactions. This is, however, not an essential condition of the invention since an increase in the size of the oligourethane molecule is not necessary for certain fields of application. The various particularly preferred groupings which make it possible for chain lengthening reactions to take place include isocyanate groups arranged in end positions or acylated amino groups arranged in end positions, e.g., biuret or urea groups. Oligourethanes with isocyanate end groups which are suitable for the process according to the invention include, for example, the isocyanate prepolymers with ionic and/or non-ionic hydrophilic groups described in U.S. Pat. Nos. 4,108,814; 3,479,310 and 3,905,929 and German Offenlegungsschriften Nos. 2,721,985 and 2,651,506. According to the teaching disclosed in these prior publications, these prepolymers can be converted into aqueous dispersions of high molecular weight polyurethanes by a reaction with water or with aqueous solutions of suitable chain lengthening agents, in particular, organic diamines. Suitable oligourethanes also include the prepolymers according to German Offenlegungsschrift No. 2,725,589 which can be converted into aqueous dispersions by a reaction with ketimines in the presence of water, those according to German Offenlegungsschrift No. 2,732,131 which can be similarly converted by a reaction with oxazolidines and those according to German Offenlegungsschrift No. 2,811,148 which can be converted into aqueous dispersions by a reaction with azines in the presence of water.

Suitable oligourethanes for the purpose of the invention also include those with acylated amino nitrogen in end positions according to U.S. Pat. Nos. 3,756,992 and 4,094,842 and German Offenlegungsschrift No. 2,637,690, all of which are hereby incorporated by reference, which according to the teaching of these prior publications can be converted into aqueous solutions or dispersions of high molecular weight polyurethanes by a reaction with suitable chain lengthening or cross-linking agents such as formaldehyde, aqueous formaldehyde, compounds which react like formaldehyde or compounds which give off formaldehyde. Self cross-linking oligourethanes according to German Offenlegungsschrift No. 2,642,073 are also suitable for the process according to the invention.

The essential feature of the invention is that the additives which are insoluble and not dispersible in water are incorporated in the exemplified oligourethanes before the latter are dispersed in water. The additives are generally stirred into the liquid or molten oligourethane. This operation is generally carried out at a temperature from about 20° to 150° C., preferably from about 50° to 120° C. The resulting combination, in the form of a liquid or a solvent-free melt at a temperature of about 20° to 150° C., preferably about 40° to 120° C., is then dispersed in water or in an aqueous solution of a chain lengthening agent of the type exemplified above, at a temperature in the range of about 5° to 100° C., preferably about 20° to 85° C. If a masked chain lengthening agent such as a ketimine, oxazolidine or azine is used for the oligourethane in accordance with the above-mentioned prior publications, these auxiliary agents are mixed with the oligourethane (isocyanate prepolymer) before dispersion in accordance with the teaching of the aforesaid prior publications, in addition to the auxiliary agents and additives which are essential to the invention.

The incorporation with the oligourethane of the auxiliary agents and additives which are essential to the invention may also be carried out before the oligourethane is prepared, for example, by mixing the said auxiliary agents and additives with a starting material for the preparation of the oligourethane, provided, of course, that the particular auxiliary agents and additives used in this way are inert in the sense of not taking part in an isocyanate addition reaction.

When incorporating the auxiliary agents and additives, it may in some cases be advantageous to use a solvent to improve the homogeneity. These solvents are used in a quantity of not more than about 20% by weight, preferably not more than about 5% by weight, based on the dispersed oligourethane or polyurethane. It is, of course, particularly preferred to incorporate the auxiliary agents and additives without the aid of solvents. The solvents, if used, (e.g., acetone, methyethyl ketone, isopropanol, mono- or diethylene glycol, methylethyl- or butyl glycol or N-methylpyrrolidone) is generally distilled off before the oligo- or polyurethane is dispersed or during or immediately after dispersion, optionally under vacuum, so that a solvent-free dispersion is obtained. Some solvents, however, may be left in the dispersion up to a quantity of about 10% by weight or they may be added after the dispersion has been prepared. These solvents left in the dispersion should as far as possible have an ignition point above about 0° C., preferably above about 21° C. These solvents are only used out of practical necessity and serve either as frost stabilizers for the aqueous dispersion, as in the case of mono- or diethylene glycol, or as levelling and penetrating agents for easier application of the dispersion, as in the case of butyl acetate.

The nature and quantity of auxiliary agent or additive to be used depends solely on the intended effect. The essential feature of the invention is that the additives are on their own, neither soluble nor dispersible in water but are distinctly hydrophobic in character and may even, as in the case of some waxes, be virtually insoluble in all media.

It is also unnecessary to use an additional emulsifier such as would be required, for example, if the aqueous dispersion were mixed with aqueous emulsions, suspensions or powders of the additives exemplified below. An essential feature of the invention is that the oligourethane or the polyurethane formed from it by chain lengthening serves as enveloping agent, solvent, emulsifier and/or plasticizer for the additives. It is in this way that the process according to the invention gives rise to dispersions which are clearly superior in their ability to be processed and in the physical fastness characteristics of films produced from them, to comparable dispersions consisting of dispersion mixtures.

The following are mentioned as examples of suitable auxiliary agents and additives according to the invention.

1. Cellulose derivatives, e.g., cellulose ethers such as ethyl cellulose, cellulose esters of organic acids, e.g., cellulose acetate, cellulose propionate, cellulose butyrate, cellulose acetobutyrate, which may be modified with plasticizers, cellulose esters of inorganic acids, e.g., cellulose sulphate or cellulose phosphate, or the various types of nitrocelluloses.

2. Natural and synthetic waxes, e.g., carnauba wax, shellac wax, montan wax, paraffin wax, polyethylene wax, ester waxes, amide waxes such as the diamide of stearylamine and adipic acid, and acid waxes.

3. Fats, resins, oils and water insoluble and indispersible metal soaps of vegetable or animal origin or of a synthetic nature, e.g., terpene resins, lignanes, stilbene resins, benzoin, Peru and Tolu balsam, resins of conifers, copals, dammar, colophony, polymer resins, olefin resins, coumaroneindene resins, naphthalene resins, ketone resins, phenol resins, epoxy resins, aldehyde resins, aminoplasts, tall oil, train oil, ground nut and coconut fat, linseed oil, castor oil, soya bean oil, tallow, sperm oil and metal soaps such as aluminum, barium, cobalt, copper, lithium or zinc stearates or palmitates.

4. Proteinaceous products such as albumins, casein and proteins, e.g., from soya bean flour.

5. Silicon compounds such as silanes, in particular, organosilanes such as tetraalkyl silanes, organosilanoles, e.g., those prepared by hydrolysis or trialkyl halogen silanes, siloxanes, in particular organo(hetero) polysiloxanes optionally containing polyether groups and/or alkyl, cycloalkyl and/or aryl groups and preferably having a molecular weight above about 500 and particularly those obtained in the form of oils or resins.

6. Hydrophobicizing agents, e.g., long chain paraffins, organic fluorine compounds such as fluorinated hydrocarbon oils having an average molecular weight above about 700, and compounds containing both fluorinated hydrocarbon groups and saturated or unsaturated hydrocarbon groups.

The auxiliary agents and additives which are to be used according to the invention are either substances which are compatible with the oligourethane, i.e., those which can be mixed homogeneously with the oligourethane or are soluble in it, or substances which are insoluble in the oligourethane. In the latter case, however, care must be taken to ensure fine distribution of the auxiliary agents and additives. This means that they should be mixed in a very finely divided form with the oligourethane, so that if they are solid and do not melt under the conditions employed for mixing they must have a particle size of not more than about $10^{-2}$ mm. Those auxiliary agents exemplified under 1 and 2 are preferred. The cellulose derivatives mentioned under 1 are particularly preferred additives.

The dispersions obtainable by the process according to the invention generally have a solids content of about 2 to 60%, preferably about 20 to 50% by weight, the proportion of the auxiliary agents and additives according to the invention amounting to about 0.3 to 50%, preferably about 1 to 20% by weight, based on the total solids content.

Like all polyurethane dispersions, the dispersions obtained by the process according to the invention are miscible with other dispersions which are either nonionic or have the same ionic character. This means that the dispersions obtained according to the invention are miscible with other dispersions, such as those based on polyurethane, polyacrylate, polybutadiene, polyesters or various (co)polymers, e.g., those based on styrenebutadiene copolymers, styrene-acyrlonitrile copolymers, polyacrylic acid esters or poly(meth)acrylates, which other dispersions may also contain external emulsifiers.

The process according to the invention serves to improve the properties of aqueous dispersions of oligourethanes or polyurethanes by the incorporation according to the invention of the auxiliary agents and additives which have been exemplified, which themselves perform the function of thickeners, levelling agents, agents to improve handle or texture, fillers, adhesifying agents, agents to impart a hydrophobic character or mold release agents. Additional auxiliary agents and additives such as pigments, thickeners, diluents, substances to improve handle or texture, fillers or plasticizers may, if desired, be incorporated with the dispersions according to the invention over and above the aforementioned auxiliary agents and additives which are incorporated according to the principle of the invention, although these additional auxiliary agents and additives are generally unnecessary because the dispersions already contain these additives which are often desirable for practical application of the products.

It is, of course, also possible to add external emulsifiers to the oligomer before or after its dispersion, but this would generally only be considered if it provides advantages for subsequent processing or application of the product. Examples of suitable emulsifiers for this purpose include ethoxylated alkyl phenols having an average molecular weight of about 400 to 10,000.

The aqueous dispersions according to the invention may also be modified subsequently with isocyanates, as described in German Offenlegungsschrift No. 2,708,442 and U.S. Pat. No. 4,186,118. The dispersions containing auxiliary agents and additives obtained according to the invention are particularly suitable for use as coating compounds for any flexible or rigid substrates such as leather, textiles, rubber, synthetic materials such as PVC, glass, metals, paper or wood, where they may fulfill the function of a finish, lacquer or adhesive. The dispersions are suitable for the dressing of leather and for use as lubricants, mold release agents or sizes for glass fibers or other fine drawn materials. They may also be used as dispersing auxiliaries or binders for various organic or inorganic materials. One preferred application of the dispersions according to the invention lies in their use as finishes for leather or leather-like synthetic products. For this purpose, the dispersions may be applied to the substrates by, for example, application with a doctor wiper or plush applicator or in particular by spraying, at about 10° to 60° C., preferably at room temperature, in a quantity corresponding to about 5 to 50 g/m$^2$, preferably about 10 to 20 g/m$^2$ of oligourethane or polyurethane solids content, the coated substrate then being dried at a temperature of about 20° to 180° C., preferably at about 50° to 140° C.

The percentages given in the following Examples are percentages by weight unless otherwise indicated.

EXAMPLE 1

Reaction mixture:

| | |
|---|---|
| 300 g | of phthalic acid/ethylene glycol polyester (hydroxyl number 288) |
| 85 g | of a NaHSO$_3$ adduct of propoxylated butenediol (hydroxyl number 261; 70% in toluene) |
| 228.6 g | of hexamethylene diisocyanate |
| 54.6 g | of urea |
| 117.6 g | of carnauba wax |
| 700 g | of desalted water |
| 100 g | of formaldehyde (30% in water) |

Method

The polyester and the adduct were dehydrated in a water jet vacuum at 110° C. with stirring for 30 minutes. The mixture was then cooled to 80° C. and the diisocyanate was added. Stirring was continued at 80° C. until an isocyanate content of 6.4% was reached (about 6 hours). Urea was added and the reaction mixture was heated to 130° C. The solvent-free liquid was stirred until no more isocyanate was found. Carnauba wax was stirred in large lumps at 120° C. into the isocyanate-free, solvent-free liquid of the resulting oligourethane which had a calculated molecular weight of about 1,410. After 30 minutes stirring, the solvent-free liquid was dispersed with water at a temperature of 80° C. Stirring was continued for 2 hours at 80° C. Formaldehyde was then added and stirring continued for 1 hour at 80° C. The reaction mixture was cooled to room temperature and filled into containers through a 100μ sieve.

A finely divided dispersion showing a Tyndall effect in transmitted light and having a solids content of 50.25% and a Ford cup viscosity (4 mm nozzle) of 24.3 seconds was obtained. The pH of the dispersion was 4. The dispersion was stable to centrifuging (3,600 revs. per min.; 20 minutes).

The dispersion is suitable for use as an additive to aqueous leather finishes to improve the handle. Leather which has been treated with this dispersion is distinguished by its pleasant, smooth handle which is further enhanced by ironing the leather at 80° to 120° C.

COMPARISON EXAMPLE 1

When attempts are made to mix carnauba wax in large lumps or a finely divided form with a previously prepared dispersion having the identical composition, two phases are invariably obtained: the finely divided polyurethane dispersion and the coarse or finely divided carnauba wax, which is incompatible with the polyurethane dispersion.

EXAMPLE 2

The reaction mixture and method were almost the same as those of Example 1 but in place of carnauba wax an equal quantity of the bisamide of stearic acid and ethylene diamine was used.

A finely divided dispersion which was stable to centrifuging was again obtained. It had a Ford cup viscosity (4 mm nozzle) of 41.8 seconds when its solids content was 45.7% and the pH was 4.

This dispersion is also suitable for use as an additive to aqueous PU leather dressings to improve the handle, and it imparts a pleasant waxy handle to leather.

COMPARISON EXAMPLE 2

In experiments similar to those described in comparison Example 1, equally unsatisfactory results were obtained with the bisamide.

EXAMPLE 3

Reaction mixture:

| | | |
|---|---|---|
| A | 230.0 g | of a polypropylene glycol ether (hydroxyl number 197) started on bisphenol A |
| | 71.3 g | of a polyester of phthalic acid, adipic acid and ethylene glycol (hydroxyl number 64.1) |
| | 40.0 g | of a polypropylene-polyethylene glycol polyether started on butanol (molar ratio propylene oxide: ethylene oxide 17:83; hydroxyl number 26) |
| | 40.0 g | of a NaHSO$_3$ adduct of propoxylated butenediol hydroxyl number 261; 70.5% in toluene) |
| | 1.4 g | of dimethylol propionic acid (DMPA) |
| | 102.1 g | of 4,4'-bis-(isocyanatocyclohexyl)-methane |
| | 65.6 g | of hexamethylene diisocyanate |
| | 39.0 g | of ammonia (25% in water) |
| | 46.9 g | of nitrocellulose (moistened with 41.2% water) |
| | 1100.0 g | of desalted water |
| | 30.4 g | of isophorone diisocyanate (IPDI) |
| | 75.6 g | of formaldehyde (30% in water) |
| | 16.6 g | of monoethylene glycol |

Method

The polyols A were dehydrated in a vacuum at 120° C. with stirring for 30 minutes. DMPA was then added at 80° C. and, after 10 minutes stirring, the first two diisocyanates mentioned above were added. Stirring was continued at 90° C. until the isocyanate content was 4.6%. Aqueous ammonia was then added at 70° C. A solvent-free liquid of an oligourethane having an average calculated molecular weight of about 1910 was obtained after 50 minutes stirring. 50 g of water were stirred into this liquid to reduce the risk of explosion, and nitrocellulose which had been moistened with water was stirred in immediately afterwards. Half an hour later, the melt was dispersed in the remaining water at room temperature. It was then stirred for 2 hours at 45° C. and IPDI was subsequently added at room temperature in accordance with the teaching of German Offenlegungsschrift No. 2,708,442, to prevent any visible formation of foam. After 2 hours stirring at room temperature, the temperature was raised to 50° C. within one further hour and maintained at 50° C. for 2 hours. The formaldehyde was then added and the mixture was stirred for 90 minutes at 50° C. Finally, monoethylene glycol was stirred in and when the dispersion had cooled to room temperature it was filled into containers through a 100µ sieve.

The finely divided dispersion had a solids content of 29.7% and a Ford cup viscosity (4 mm nozzle) of 12.8 seconds. The pH was 5.

When used as an aqueous leather dressing, the dispersion is distinguished by its excellent levelling flow when applied with a spray gun. The handle of the leather depends on the nitrocellulose and corresponds to the results obtained with applications of nitrocellulose from organic solvents.

COMPARISON ON EXPERIMENT 3

Attempts to incorporate the moistened nitrocellulose with a polyurethane dispersion having the same PU composition all yielded unsatisfactory results. The nitrocellulose could not be transferred to the aqueous dispersion without the aid of organic solvents.

EXAMPLE 4

Reaction mixture:

| | | |
|---|---|---|
| A | 244.6 g | of a polyester of phthalic acid and ethylene glycol (hydroxyl number 288) |
| | 109.1 g | of a polyester of phthalic acid, adipic acid and ethylene glycol (hydroxyl number 64.1) |
| | 61.2 g | of a polypropylene-polyethylene-glycol polyether started on butanol (molar ratio propylene oxide: ethylene oxide 17:83; hydroxyl number 26) |
| | 49.4 g | of a NaHSO₃ adduct of propoxylated butenediol (hydroxy number 261; 70.5% in toluene) |
| | 154.2 g | of 4,4'-bis-(isocyanatocyclohexyl)-methane |
| | 98.9 g | of hexamethylene diisocyanate |
| | 53.7 g | of ammonia (25% in water) |
| | 42.0 g | of oleic acid amide |
| | 1180.0 g | of desalted water |
| | 45.0 g | of isophorone diisocyanate |
| | 115.0 g | of formaldehyde (30% in water) |
| | 21.0 g | of monoethylene glycol |

Method (The same as Example 3 but without the addition of water before the introduction of filler (oleic acid amide).

The finely divided dispersion with a solids content of 41.2% had a Ford cup viscosity (4 mm nozzle) of 66.9 seconds. The pH was 5.

The dispersion is suitable for use as additive in aqueous PU leather dressings to improve the handle.

COMPARISON EXAMPLE 4

Oleic acid amide is also extremely hydrophobic and therefore cannot be incorporated subsequently in a dispersion corresponding to that of Example 4.

EXAMPLE 5

Reaction mixture:

| | | |
|---|---|---|
| A | 160.0 g | of a polyester of phthalic acid and ethylene glycol (hydroxy number 288) |
| | 71.3 g | of a polyester of phthalic acid, adipic acid and ethylene glycol (hydroxyl number 64.1) |
| | 34.0 g | of a polyether started on butanol (molar ratio propylene oxide: ethylene oxide 17:83; hydroxyl number 26) |
| | 26.4 g | of a NaHSO₃ adduct of propoxylated butenediol (hydroxyl number 261; 70.5% in toluene) |
| | 112.4 g | of 4,4'-bis-(isocyanatocyclohexyl)-methane |
| | 72.1 g | of hexamethylene diisocyanate |

-continued

| | |
|---|---|
| 38.9 g | of ammonia (25% in water) |
| 16.6 g | of cellulose acetobutyrate having an acetyl content of 15% and a melting range of 170 to 190%, dissolved in |
| 20 ml | of acetone, |
| 720.0 g | of desalted water, |
| 45.0 g | of formaldehyde, 30% in water, and |
| 16.6 g | of monoethylene glycol |

Method (The same as in Example 4. The acetone used was evaporated off under vacuum before dispersion; no after-treatment with IPDI).

A finely divided dispersion which was stable to centrifuging (3,600 revs. per min.) was obtained. At a solids content of 37.7% it had a Ford cup viscosity (4 mm nozzle, DIN 53211) of 71.2 seconds. The pH was 5.

When sprayed on leather, the product produces excellent finishes which are fast to wet abrasion.

COMPARISON EXAMPLE 5

When a similar acetonic solution was added to a corresponding PU dispersion not containing the appropriate cellulose acetobutyrate, the problems entailed in the removal of acetone by distillation were virtually unsolvable because the dispersion foamed extremely vigorously. Furthermore, cellulose acetobutyrate immediately separated from the acetonic solution as a coarse precipitate when the solution was brought into contact with water or the aqueous dispersion. A finely divided PU dispersion containing coarse particles of rapidly sedimenting cellulose acetobutyrate was thus obtained. This dispersion was unusable.

EXAMPLE 6

Reaction mixture:

| | | |
|---|---|---|
| A | 244.6 g | of polyester of phthalic acid and ethylene glycol (hydroxyl number 288) |
| | 109.2 g | of a polyester of phthalic acid, adipic acid and ethylene glycol (hydroxyl number 64.1) |
| | 61.2 g | of a polypropylene-polyethylene glycol polyether started on butanol (molar ratio propylene oxide: ethylene oxide 17:83; hydroxyl number 26) |
| | 45.9 g | of a NaHSO₃ adduct of propoxylated butenediol (hydroxyl number 261:70.5% in toluene) |
| | 149.8 g | of 4,4'-bis-(isocyanatocyclohexyl)-methane |
| | 95.8 g | of hexamethylene diisocyanate |
| | 50.0 g | of ammonia (25% in water) |
| | 19.8 g | of a polyether polysiloxane having a molecular weight of 10,790 and a Ford cup outflow time (4mm nozzle, DIN 53211) of 6 minutes. |
| | 9.9 g | of a cellulose propionate melting in the range of 190 to 210° C. plasticized with 7% dioctyl phthalate and dissolved in 15.0 g of acetone, |
| | 1050.0 g | of desalted water |
| | 45.0 g | of isophorone diisocyanate |
| | 115.0 g | of formaldehyde (30% in water) |
| | 25.0 g | of monoethylene glycol |

Method (As in Example 5)

A finely divided dispersion which was stable to centrifuging (3,600 revs. per min.) was obtained. At a solids content of 36.4% it had a Ford cup viscosity (4 mm nozzle) of 14.4 seconds. The pH was 7.

When sprayed on leather, the product has excellent levelling characteristics. Leather dressings obtained from this dispersion are distinguished by their high wet abrasion resistance and pleasant, dry handle.

COMPARISON EXAMPLE 6

In the same way as in Comparison Example 5, the cellulose derivative again separated from the acetonic solution as a coarse precipitate when brought into contact with water. Subsequent incorporation of the polyether siloxane into the dispersion was virtually impossible without the aid of solvents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of storage stable, aqueous dispersions of oligo-or polyurethanes containing chemically fixed ionic and/or non-ionic hydrophilic groups in an amount sufficient to ensure dispersibility in water, and auxiliary agents or additives which are neither dispersible nor soluble in water selected from the group consisting of cellulose ethers, cellulose esters of inorganic or organic acids and natural or synthetic waxes, by converting oligourethanes having a molecular weight below about 20,000 which contain chemically fixed potential ionic, ionic, or non-ionic hydrophilic groups and optionally groups enabling a chain lengthening or cross-linking reaction, into an aqueous dispersion by mixing with water, optionally with simultaneous or subsequent chain lengthening of the oligourethanes by a reaction with a chain lengthening agent and optionally with at least partial conversion of any potential ionic groups present into ionic groups, characterized in that before the oligourethanes are dispersed in water, they are intimately mixed in the liquid phase to form a mixture which contains up to 20% by weight solvent based on the weight of the oligourethanes, optionally at an elevated temperature, with said auxiliary agents or additives, or said auxiliary agents or additives are incorporated with one of the starting compounds used for the preparation of the oligourethanes.

2. The process according to claim 1, characterized in that mixing of the oligourethanes with said auxiliary agents or additives is carried out in the solvent-free liquid state at a temperature range of about 20° to 150° C.

3. In the process for coating flexible or rigid substrates, the improvement comprising using the dispersions produced by the processes of claims 1, or 2.

4. A process for the preparation of storage stable, aqueous dispersions of oligo- or polyurethanes containing
   (a) chemically fixed ionic and/or non-ionic hydrophilic groups in an amount sufficient to ensure dispersibility in water and
   (b) auxiliary agents or additives which are neither dispersible or soluble in water selected from the group consisting of cellulose ethers, cellulose esters of inorganic or organic acids and natural or synthetic waxes which comprises:
      (i) forming isocyanate-terminated oligourethanes with a molecular weight below 20,000 which contain chemically fixed potential ionic, ionic, and/or non-ionic hydrophilic groups,
      (ii) reacting the terminal isocyanate groups of said isocyanate-terminated oligourethanes to form acylated amino end groups,
      (iii) adding said auxiliary agents or additives which are insoluble and nondispersible in water prior to, during or after steps (i) and (ii) to form a mixture which contains up to 20% by weight solvent based on the weight of the oligourethanes, and
      (iv) mixing the reaction product of step (ii) which contains said auxiliary agents or additives with water to form an aqueous dispersion.

5. The process of claim 4, which comprises adding formaldehyde, aqueous formaldehyde, compounds which give off formaldehyde or compounds which react like formaldehyde to said water prior to, during or after forming the dispersions of step (iv).

6. The process of claim 5, which comprises adding formaldehyde or aqueous formaldehyde.

7. The process of claim 4, wherein said acylated amino end groups of step (ii) are formed by reacting said terminal isocyanate groups with urea or ammonia.

8. The process according to claim 4, characterized in that mixing of the oligourethanes with said auxiliary agents or additives is carried out in the solvent-free liquid state at a temperature range of about 20° to 150° C.

9. The process of claim 1 or 4 wherein said storage stable, aqueous dispersions of oligo- or polyurethanes contain up to about 5% by weight solvent based on the weight of the oligourethanes.

* * * * *